Patented Sept. 8, 1953

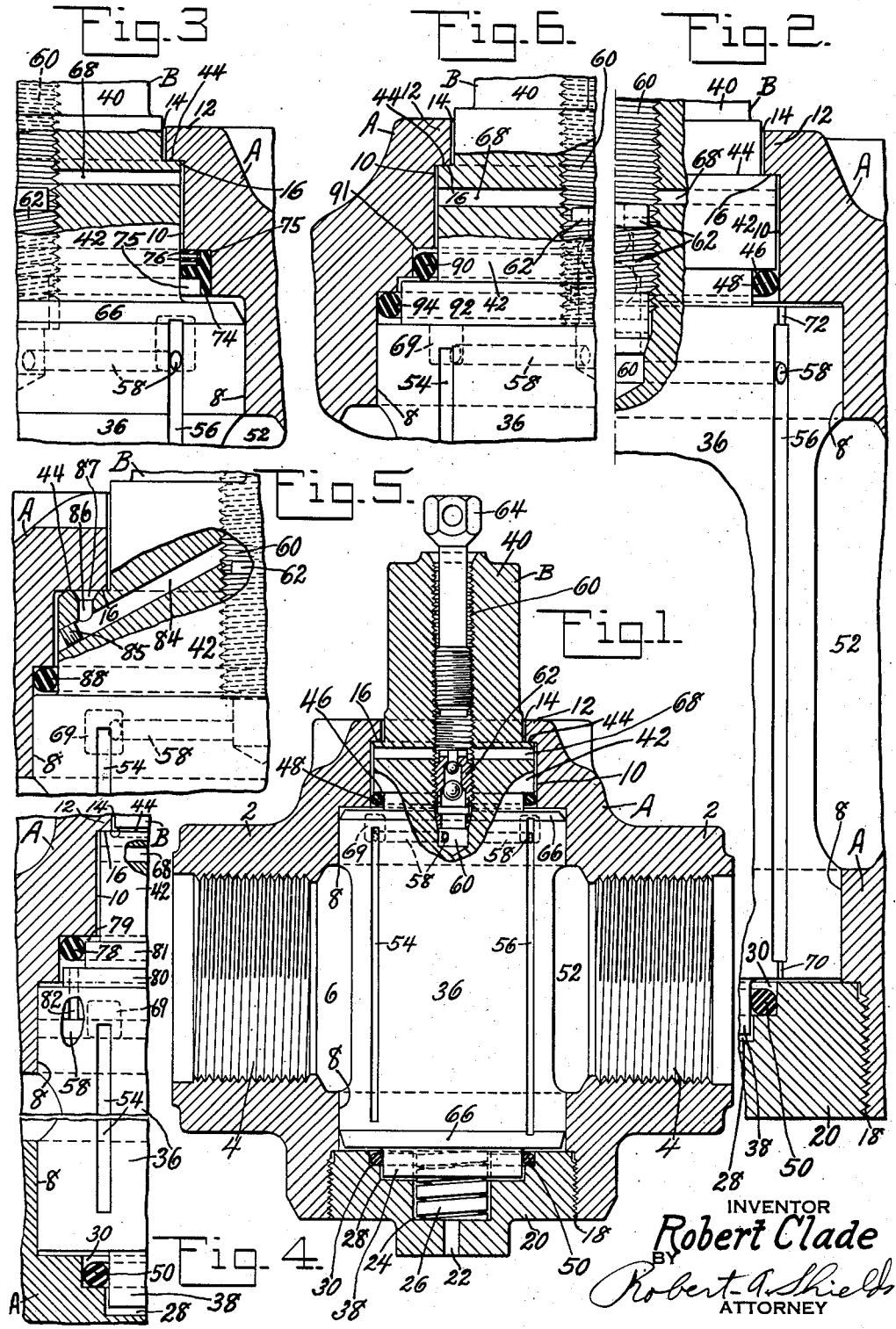

2,651,490

UNITED STATES PATENT OFFICE 2,651,490

BALANCED PLUG VALVE

Robert Clade, Detroit, Mich., assignor to American Car and Foundry Company, New York, N. Y., a corporation of New Jersey Application October 23, 1945, Serial No. 623,912

7 Claims. (Cl. 251—93)

This invention relates to valves in general and in particular to plug valves of the balanced type which are lubricated in order to reduce friction and seal the valve.

In any valve which can be lubricated under pressure some provision must be made in order to vent excess lubricant from the valve, otherwise excessive lubricant pressures will be developed and the valve body ruptured. With tapered plugs the jacking of the plug will permit escape of lubricant into the line, thus limiting lubricant pressures. With cylindrical type plug valves, however, any movement of the plug does not separate the seating surfaces of the valve and accordingly lubricant can not escape. In my prior Patent 2,038,886 longitudinal movement of the plug was utilized to permit escape of excess lubricant from within the valve proper, but escape of lubricant in this manner causes separation of a sealing surface for the valve and in case a particle of dirt becomes lodged on this seat, the valve is no longer sealed and a head leak may develop. In valves of the type disclosed in my prior patent the plug is urged against a head sealing surface by means of a spring and by the line pressure, accordingly as the size of the valve goes up and line pressure increases, it becomes virtually impossible to turn the valve without recourse to gearing or other power mechanism. The friction at the head end of the valve is found to be roughly half of the total of the friction and accordingly if this head friction can be eliminated the valve plug will turn much easier and line pressure can be increased without resorting to power mechanism. The head friction can be eliminated by balancing the plug which involves sealing the ends against leakage but sealing of the plug against leakage of line fluid prevents release of excess lubricant pressure from within the valve. The use of a simple safety relief device outside of the valve will not function since if the safety device spring is set high enough to permit lubrication of the valve under high line pressure, then if the valve is lubricated under zero line pressure, lubricant will be forced into the line, thus contaminating the material carried therein. On the other hand, if the safety spring is set low enough to permit proper lubrication under zero line pressure, it becomes worthless when the valve is under line pressure. It is an object, therefore, of the present invention to provide a balanced plug valve incorporating as an integral part of the plug a lubricant safety relief device operating outside of the sealed valve proper to release excess lubricant pressure.

Another object of the invention is the provision of a balanced plug for a sealed valve having a safety relief device operating outside of the sealed valve in accordance with lubricant pressure within the sealed valve to prevent excessive lubricant pressure.

A further object of the invention is the provision of a balanced plug valve having a safety relief device incorporated therein which will operate at a lubricant pressure outside the valve bearing a predetermined relation to the lubricant pressure within the valve.

A still further object of the invention is the provision of a valve of a substantially balanced type in which the plug ends are sealed by means of simple O rings deformable under pressure to prevent leakage of matter out of the valve proper.

These and other objects of the invention will be apparent to persons skilled in the art from a study of the following description and accompanying drawings, in which Fig. 1 is a sectional view through the improved valve;

Fig. 2 is an enlarged sectional view of a part of the valve but showing a slight modification thereof;

Fig. 3 is an enlarged sectional view disclosing a still further modified form of sealing means;

Fig. 4 is an enlarged sectional view showing a slightly modified form;

Fig. 5 discloses a still further modification in which the plug is moved by pressure outside the valve, and Fig. 6 discloses a still further modification.

Referring now to the drawings in detail it will be seen that the valve consists generally of two main parts, namely, a body A and the plug B. The body A, as clearly shown, is formed with an enlarged central part from which projections 2 extend and these extensions in the present case are internally threaded as at 4 to receive a pipe or other matter conveying means. These extensions and central part of the valve provide a passageway 6 by means of which matter may flow through the valve or be blocked by the plug when in a closed position. The valve body is provided with a bore 8 intersecting passage 6 substantially at right angles thereto and the side walls of this bore are carefully finished to provide seating surfaces cooperating with the seating surfaces of the plug to seal the valve against flow of material through the passageways. At the upper or head end of the valve the bore is reduced or counterbored as at 10. This counterbored portion is overhung by a shoulder 12 through which an opening 14 is provided for reception of the valve stem. The overhanging shoulder portion is carefully machined or finished to provide a sealing surface or safety valve seat surface 16 later to be referred to. The lower end of the bore 8 is enlarged and internally threaded as at 18 to receive a base cap 20 which is provided with a hole 22 admitting atmospheric pressure into a cavity 24 in which a spring 26 is mounted. The cap is also provided with a cavity 28 of enlarged diameter adapted to receive a stub stem of the plug and is also provided with a further cavity 30 of enlarged diameter adapted to receive a sealing means later to be referred to.

The plug B, as clearly shown, is formed with a main central part 36 of generally cylindrical form, from the ends of which extend a lower stub shaft or stem 38 and from the upper end of which extends the operating stem 40. As clearly shown, the operating stem is formed with an upper end adapted to receive an operating wrench, tool or gear and this operating portion extends through opening 14 with sufficient clearance to prevent contact therewith. The portion of the operating stem extending through opening 14 and exposed to atmospheric pressure will be of substantially the same diameter as the stem 38, thereby substantially balancing the valve in the body. Immediately below the operating portion the stem is enlarged in diameter as at 42 and the upper end is carefully finished to provide a sealing or safety valve seat 44 adapted to cooperate with the sealing surface 16 previously referred to. At the point adjacent the juncture of the stem and central portion of the plug the portion 42 is provided with a channel shaped groove 46 adapted to receive therein an O-shaped ring 48 of rubber, plastic or other suitable flexible material. As clearly shown, a second O ring 50 is located in cavity 30 in the base cap and closely engages the stub shaft 38. These O rings are of sufficiently flexible material to deform under pressure and are slightly precompressed so as to engage on their inside the plug stem and on their outside the walls of the body or cap, thereby preventing initial leakage of matter between the body and plug stem. As pressure builds up behind the O ring it will be wedged toward the clearance space between the plug stem and body and the higher the pressure, the tighter the O ring is so wedged. The plug central portion, as shown in Fig. 1, is provided with a passage 52 adapted to align with the body passage 6 when the valve is in open position and in order to seal and lubricate the valve, the seating surfaces are adapted to be smeared by lubricant placed in short grooves 54 and long grooves 56 located diametrically opposite each other on the plug surface and adjacent the ends of passageway 52. Lubricant is supplied to the relatively long grooves 56 by means of radial holes 58 extending from a central stem bore 60, within which is located a ball check device 62 and a screw or ram 64 for applying pressure to lubricant inserted within the bore. As shown, the ends of grooves 56 are intersected by the chamfered ends 66 of the plug proper in order that lubricant may be fed into the space between the plug and body at the ends of the plug proper. Lubricant from the upper end space will be fed into cavities 69 located in the valve body adjacent the head portion and so located that in the full open and full closed position of the valve they will be overlapped by short grooves 54. In any other position of the valve plug lubricant cannot be fed to these short grooves, thus preventing washout of lubricant as the short grooves move across the passageway 6. So far as described the valve is effectually sealed against leakage of material out of the valve, that is, leakage of line matter from one side of the valve to the other when the plug is closed is prevented by the smear of lubricant on the seating surfaces and leakage of line matter or lubricant outside of the valve is prevented by the O rings or sealing means adjacent the head and base portion of the plug and by means of the ball check device 62. In order to prevent rupture of the valve body by excess lubricant pressure being built up within the valve, radial passages 68 extend through the upper end of the enlarged stem portion 42 and intersect the stem lubricant bore 60 above the ball check device 62. These passages 68 are below the seating surfaces 44 and 16. Since the valve plug is urged upwardly by a spring 26, the seating surfaces 44 and 16 will be constantly urged into engagement by the pressure of this spring, thereby normally preventing leakage of lubricant out of the lubricant bore by way of passages 68 and opening 14 in the shoulder. When, however, the lubricant is being fed into the valve under pressure it will be forced past ball check device 62 into holes 58, thence into grooves 56 and into the head and base spaces and through dwarf grooves or spaces 69 into short grooves 54, thereby fully lubricating the valve. When the valve is fully lubricated the lubricant pressure will immediately increase and due to rapid increase will incraese in viscosity, thus the pressure at the head end of the plug will exceed the pressure at the base end of the plug and the valve plug will accordingly shift downwardly against compression of spring 26. As soon as the plug shifts downwardly lubricant can escape through passage 68 between seats 44 and 16 out of hole 14, thereby indicating to the operator that the valve is fully lubricated. Any dirt that might possibly be in the lubricant and become lodged between seats 44 and 16 could not cause a leak of line fluid since this safety relief is wholly outside of the valve being exterior of sealing ring 48 and ball check device 62. It will thus be seen that this valve is so designed as to be normally balanced insofar as line and atmospheric pressure is concerned, although slightly unbalanced due to the pressure of spring 26. When the valve is being lubricated, however, the lubricant pressures at the head and base of the plug will not balance due to the friction drag in the grooves and change of viscosity of the lubricant. Accordingly, the plug will shift downwardly in the body and prevent further application of pressure to the valve lubrication system.

In the form shown in Fig. 2, the valve plug and body arrangement and operation are substantially identical to that described in connection with Fig. 1 and accordingly the same reference numerals have been applied. In this form, however, increased differential pressure under lubricating conditions is obtained between the head and base portions of the plug by connecting groove 56 to these spaces by means of a small passage 70 located at the bottom end of groove 56 and a relatively larger passage 72 located at the upper end of the groove. Thus it will be seen that the lubricant pressure gaining entrance to the valve past ball check 62 may be more quickly applied to the head end of the plug and with less attenuation than it can be applied to the base end of the plug. The operation of this valve will be substantially identical to the operation of the valve of Fig. 1, the only difference being in the degree of sensitivity of movement of the plug since the differential pressure between the head and the base of the plug will increase at a more rapid rate.

The modified valve shown in Fig. 3 is almost identical with that shown in Fig. 1 and accordingly the same reference numerals have been applied wherever possible. In this form, however, instead of having the O ring 48 located in a recess in the plug stem a T-shaped ring 74 of rubber, plastic or other resilient material is set in a recess 75 formed in the head portion of the valve body. The arm portions of this T ring are in close engagement with the body of the valve, while the leg of the T is in close engagement with the enlarged portion 42 of the plug stem. The leg of the T-shaped ring is backed up and reinforced by rings or washers 76 preferably formed of a relatively hard plastic material. This T ring type of seal prevents leakage of line pressure around the stem by deformation under pressure. Insofar as operation of the valve is concerned, it will operate in almost identically the same manner as the valve described in connection with Fig. 1 and accordingly a repetition is not necessary.

In general, the modified valve of Fig. 4 is very similar to the valve of Fig. 1 and accordingly wherever possible the same reference numerals have been applied. In this form, however, the top O ring sealing means 78 is located in a recess 79 formed in the body intermediate the counterbore portion 10 and the plug seating bore 8. The plug also is modified by being provided with stepped shoulders 80 and 81 formed on the operating stem between the plug proper and the enlarged portion 42 of the stem. These shoulders are so arranged as to provide a space for reception of ring 78 between shoulder 81 and the valve body. In this valve the long grooves 56 (not shown) do not connect with the head space at the upper end of the plug, instead a short axial hole 82 is provided extending between the upper surface of shoulder 80 and the lubricant holes 58 extending from the lubricant source of supply to the long grooves 56. Thus it will be seen that lubricant can be supplied almost directly beneath sealing ring 78 by holes 58 and 82, thus permitting a lubricant pressure to build up at the head end of the valve more rapidly than at the base. It is to be noted, however, that the area between the edge of shoulder 81 and the bore 8 is less than the area between the body bore 8 and the stem 38, accordingly in this form the valve will be slightly unbalanced under normal conditions, with the unbalance aiding the spring in forcing surfaces 16 and 44 together. By more or less direct application of lubricant from the source to the head space sufficient pressure will be developed to overcome the pressure at the base of the plug, thereby permitting the plug to shift downwardly and permit escape of lubricant out of hole 14 in the head.

In the modified form shown in Fig. 5 the enlarged portion 42 has been increased in diameter relative to the plug proper, thereby requiring enlargement of the safety valve seating surfaces 16 and 44 formed respectively on the overhanging shoulder of the body and at the upper end of the enlarged portion 42 of the plug. In this form a plurality of holes 84 are bored through the enlarged portion 42 so as to intersect the lubricant bore 60 above the ball check device 62 (not shown). The outer ends of these holes are plugged as at 85 and an axially extending hole 86 is bored intersecting hole 84 between the lubricant bore and plug 85. The upper ends of these holes 86 are flared as at 87, thereby permitting application of lubricant pressure to a predetermined area of the overhanging seat 16. By careful proportioning of the flaring portions 87 and their number the areas on which pressure can act may be carefully controlled. In this form the O ring sealing means 88 is located in the space formed between the bore 8 and enlarged stem portion 42. In this form the axial shift of the plug in the body will be caused by the lubricant pressure acting directly on the predetermined areas provided by the flared openings 87, permitting the lubricant to act directly on the seating surface 16. In other words, the valve will be shifted by pressure acting externally of the sealed valve proper.

In the form previously described in connection with Fig. 4 lubricant under pressure can be applied to the upper side of sealing ring 78 through passage 68 and the space between stem portion 42 and the body. Since this pressure will be higher than that applied beneath the ring, the ring will shift down and add its shifting effect to that obtainable through passage 82 within the valve proper. In the form shown in Fig. 6, however, application of this force is prevented by means of a sealing ring 90 located in a space provided by recess 91 formed in the body adjacent the intersection of enlarged portion 42 of the stem and a stepped portion 92 located between the portion 42 and the plug proper. A second sealing ring 94 is located in the space provided between the stepped portion of the plug and the bore 8 of the body. The rings 94 and 90 will function together to prevent any leakage of matter out of the valve around the stem, while ring 90 will prevent application of lubricant pressure through passage 68 onto the sealing ring 94 or onto the upper end of the plug and stepped portion 92.

In all of the forms described the plug is substantially of the balanced type under normal operating conditions, although as referred to it may be slightly unbalanced, both by the spring and by proportioning the head and base areas so as to permit a certain predetermined amount of line pressure to assist the spring in holding the safety valve surfaces 16 and 44 in engagement. In order that the plug may shift axially a slight amount relative to the body, the lubricant system grooves and pressure areas at the head and base portion of the valve proper are so inter-related as to provide a differential pressure when the valve is being lubricated, which pressure will build up to a sufficient amount to cause axial shifting of the plug and separation of the safety seating surfaces 16 and 44. The term valve proper, as previously and subsequently used, is applied to mean the portions of the valve which cooperate to prevent leakage of matter out of the valve and control its flow through the body passage 6. In other words, the valve proper would include the body and plug together with its stub stem and operating stem. The valve proper is, of course, sealed against leakage of matter out of the valve by the head and base sealing rings or members and by the ball check device 62. After lubricant has passed the ball check device 62 it will be considered as within the valve proper, whereas before it has passed the ball check device it will be outside of the valve proper. Thus it will be seen that the safety valve seating surfaces 16 and 44, although formed as an integral part of the plug and body, are actually located outside of the valve proper, but in general the separation or contact of these surfaces is controlled by means within the valve proper, that is, in the substantially fully balanced valve of Figs. 1 and 2 the surfaces 16 and 44 are urged together by spring 26 and they are separated by means of lubricant pressure only acting between the body and top end of the plug wholly within the valve proper, that is, inside of sealing ring 48. In some cases, as in Fig. 4, line pressure acting on the base of the plug within the valve will assist the spring in holding the safety sealing surfaces in engagement. Separation of the sealing surfaces will be obtained partially by pressure acting within the valve proper and partially by pressure acting outside the valve proper, that is, by pressure acting through passage 68 onto the upper surface of ring 78 and stepped portion 81. In the form of Fig. 5 since lubricant can not readily gain admission beneath the sealing ring 88 nor above the ring 88, the axial shift of the plug in the body will be obtained by pressure through passage 86, which pressure accordingly acts wholly outside the valve proper. From the preceding it will be seen that by properly proportioning the valve areas and properly selecting the location of the sealing means, the safety valve seating surfaces can be urged into engagement with any desired degree of pressure and can be separated either by lubricant pressure acting wholly within the valve or partially within and partially without the valve proper, or wholly outside the valve proper. That the lubricant safety device will operate independently of line pressure is believed self evident since the pressure areas on which the line pressure can act are substantially balanced and the axial shift of the plug is dependent only upon the differential pressure established within the lubricant system between the head and base ends of the plug.

While the improved valve has been described with specific reference to various modifications, it will be obvious that other valves may be constructed by rearranging and proportioning parts to secure proper operation under varying conditions and all such rearrangement and proportioning of parts are contemplated as will fall within the scope of the appended claims defining my invention.

What is claimed is:

1. A lubricated valve of the substantially balanced type comprising, a valve body member having a passageway therethrough for the flow of matter, a bore extending transversely of said passageway, a valve plug member mounted in said bore for axial movement therein and also rotatable therein to control the flow of matter through the passageway, stems projecting from the ends of said valve plug and subject to atmospheric pressure at their ends, predetermined clearance spaces between said stems and body, and sealing means engaging said stems and body and shiftable longitudinally of the bore by pressure of matter in the passageway to close said clearance spaces and prevent escape of matter from said valve around said stems without restricting the axial movement of said plug, said sealing means comprising rings of resilient material having a substantially circular cross-section.

2. A lubricated valve of the substantially balanced type comprising, a valve body member having a passageway therethrough for the flow of matter, a bore extending transversely of said passageway, a valve plug member mounted in said bore for axial movement therein and also rotatable therein to control the flow of matter through the passageway, stems projecting from the ends of said valve plug and subject to atmospheric pressure at their ends, predetermined clearance spaces between said stems and body, and sealing means engaging said stems and body and shiftable longitudinally of the bore by pressure of matter in the passageway to close said clearance spaces and prevent escape of matter from said valve around said stems without restricting the axial movement of said plug, said sealing means comprising rings of resilient material having a substantially circular cross-section, at least one of said rings being mounted in a groove cut in one of said members.

3. A lubricated valve of the substantially balanced type comprising, a valve body member having a passageway therethrough for the flow of matter, a bore extending transversely of said passageway, a valve plug member mounted in said bore for axial movement therein and also rotatable therein to control the flow of matter through the passageway, stems projecting from the ends of said valve plug and subject to atmospheric pressure at their ends, predetermined clearance spaces between said stems and body, and sealing means engaging said stems and body and shiftable longitudinally of the bore by pressure of matter in the passageway to close said clearance spaces and prevent escape of matter from said valve around said stems without restricting the axial movement of said plug, said sealing means comprising rings of resilient material having a substantially circular cross-section, at least one of said rings being mounted in a channel shaped groove cut in one of said stems.

4. A lubricated valve comprising, a valve body having a passageway therethrough for the flow of matter, a bore extending transversely of the passageway, a valve plug rotatable in said bore to control the flow of matter therethrough, a valve stem connected to said valve plug and projecting out of said body, a channel shaped groove formed in said valve stem, and a resilient sealing ring of substantially circular cross-section located in said groove, said resilient sealing ring engaging said body and stem and shiftable in said groove axially of said stem by pressure of matter in the passageway to prevent passage of matter in either direction along said stem.

5. A lubricated valve of the balanced type comprising a valve body having a passageway therethrough for the flow of matter and a bore extending transversely of said passageway, a valve plug mounted in said bore for slight axial movement and rotatable to control the flow of matter in the passageway, said valve having bearing portions and substantially similar end surface areas exposed to atmospheric pressure, sealing members between the body bore wall and the ends of the plug beyond the bearing portions, said plug being shiftable axially while sealed with the body by said members, a stem connected to one end of the plug and extending out of the body for reception of operating means, a groove system for the passage of lubricant to lubricate and seal the adjacent surfaces of the bearing portions of said plug and said bore, a source of lubricant under pressure in said stem connected to said groove system and open to the body bore adjacent the stem and beyond the adjacent sealing member, check means in said stem preventing return flow of lubricant from said groove system to said source, and normally engaged sealing surfaces on the body and the end of the plug having the extension, said sealing surfaces lying in a plane perpendicular to the longitudinal axis of the plug, said valve plug being shifted axially in response to excess lubricant pressure conditions in the valve to separate the sealing surfaces and provide a vent through which lubricant flows outwardly of the body directly from the source until the pressure is again normal.

6. A lubricated valve of the balanced type comprising a valve body having a passageway therethrough for the flow of matter and a bore extending transversely of said passageway, a valve plug having bearing end portions mounted in said bore for slight axial movement and rotatable to control the flow of matter in the passageway, the ends of said plug having similar surface areas exposed to atmosphere, sealing members between the plug ends and the body bore wall located between the exposed end areas and the end bearing portions, said plug being shiftable in the bore while maintaining the seals, a stem connected to one end of the plug and extending out of the body for reception of operating means, a shoulder formed on said stem and provided with a safety seating surface, a shoulder formed on said body and overlapping said stem and provided with a safety seating surface cooperating with said first named safety seating surface, a lubrication system for said valve including passageways leading to the plug bearing portions, a lubricant storage chamber, a source of pressure for lubricant in the chamber and check means through which lubricant flows to the valve, said check means preventing reverse flow of lubricant from the valve passageways to the source, a passage in the stem connected to said source and open to the body bore adjacent said safety seating surfaces and beyond the adjacent sealing member for venting lubricant directly from said source to atmosphere without having to pass through said check means when said safety seating surfaces are disengaged by excessive lubricant pressure conditions existing within the valve, and means normally urging said safety seating surfaces into engagement to prevent venting of lubricant from said source.

7. A lubricated valve of the balanced type comprising a valve body having a passageway therethrough for the flow of matter and a bore extending transversely of said passageway, a valve plug having substantially similar bearing end portions mounted in said body bore, said plug being rotatable to control the flow of matter in the passageway, members sealing the ends of said valve plug beyond said bearing portions relative to said body and the ends of the plug having similar surface areas exposed to atmosphere, said plug being axially shiftable in the bore while maintaining the seal, a stem connected to one end of the plug and extending out of the body for reception of operating means, an enlargement formed on said stem and provided with a safety seating surface, a shoulder formed on said body and overlapping said enlargement and also provided with a safety seating surface cooperating with said first named safety seating surface, a lubrication system for said valve including a source of lubricant under pressure connected with a passageway in the plug leading to the valve bearing portions, check valve means preventing reverse flow from the passageways to the source, a passage in the plug beyond the check means connected to said source and opening adjacent said safety seating surfaces for venting lubricant directly from said source, and spring means normally urging said safety seating surfaces into engagement to prevent venting of lubricant from said source, said last named means permitting said safety seating surfaces to separate and vent lubricant from said source in accordance with pressure conditions existing in said valve on the side of said check means remote from the source of pressure.

ROBERT CLADE.

References Cited in the file of this patent

UNITED STATES PATENTS

| Number | Name | Date |
|---|---|---|
| 1,743,015 | Crosby | Jan. 7, 1930 |
| 1,923,295 | Carpenter | Aug. 22, 1933 |
| 2,038,888 | Clade | Apr. 28, 1936 |
| 2,070,899 | Hamer | Feb. 16, 1937 |
| 2,171,590 | Milliken | Sept. 5, 1939 |
| 2,313,090 | Reiser | Mar. 9, 1943 |
| 2,319,943 | Nordstrom | May 23, 1943 |
| 2,336,027 | Milliken | Dec. 7, 1943 |